Inventor.
Paula Jackson.
by Robert H. Wendt
Attorney.

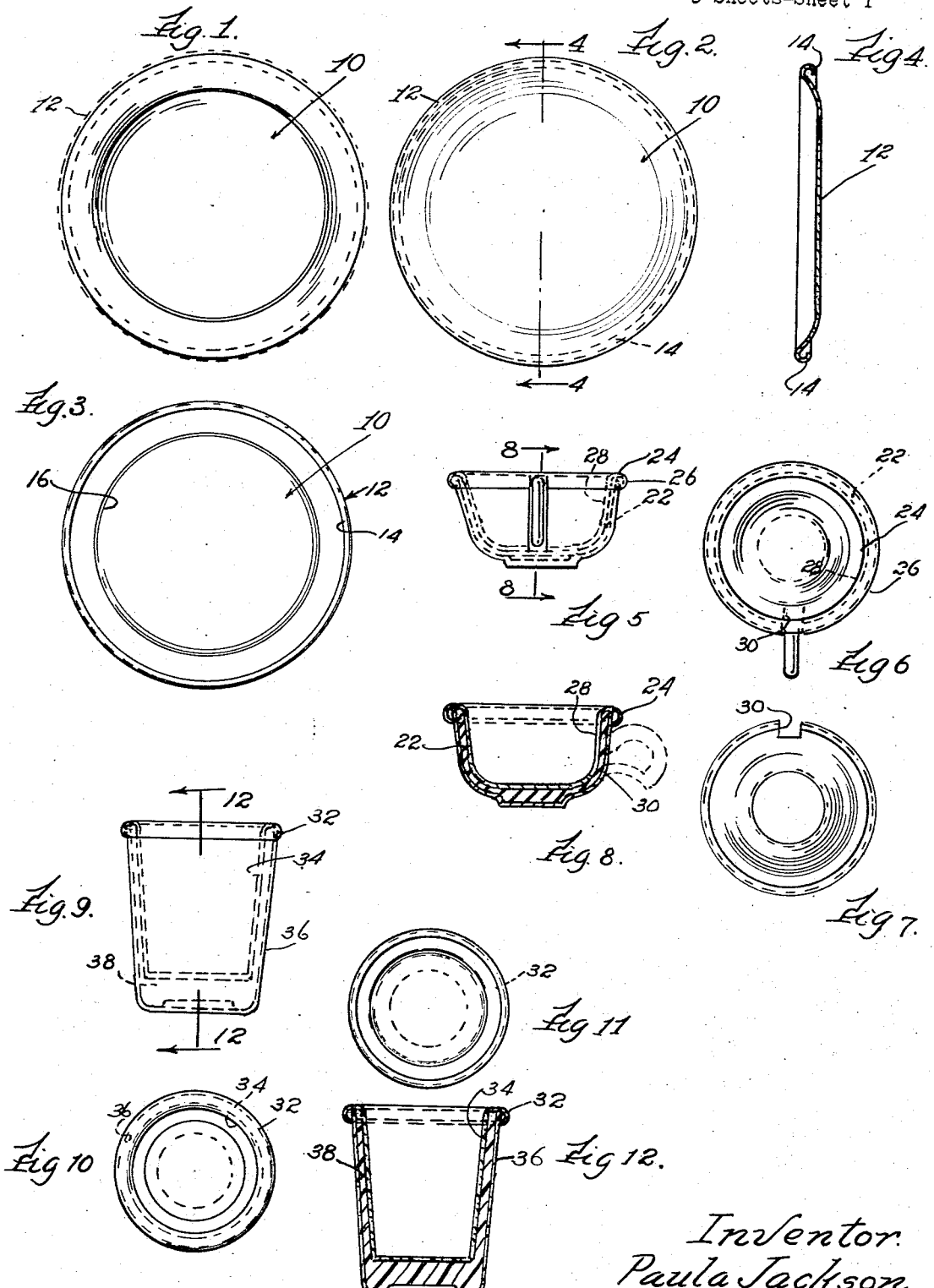

Nov. 14, 1967     P. JACKSON     3,352,449
SLIP COVERS FOR RECEPTACLES FOR FOOD
Filed July 26, 1965     3 Sheets-Sheet 3
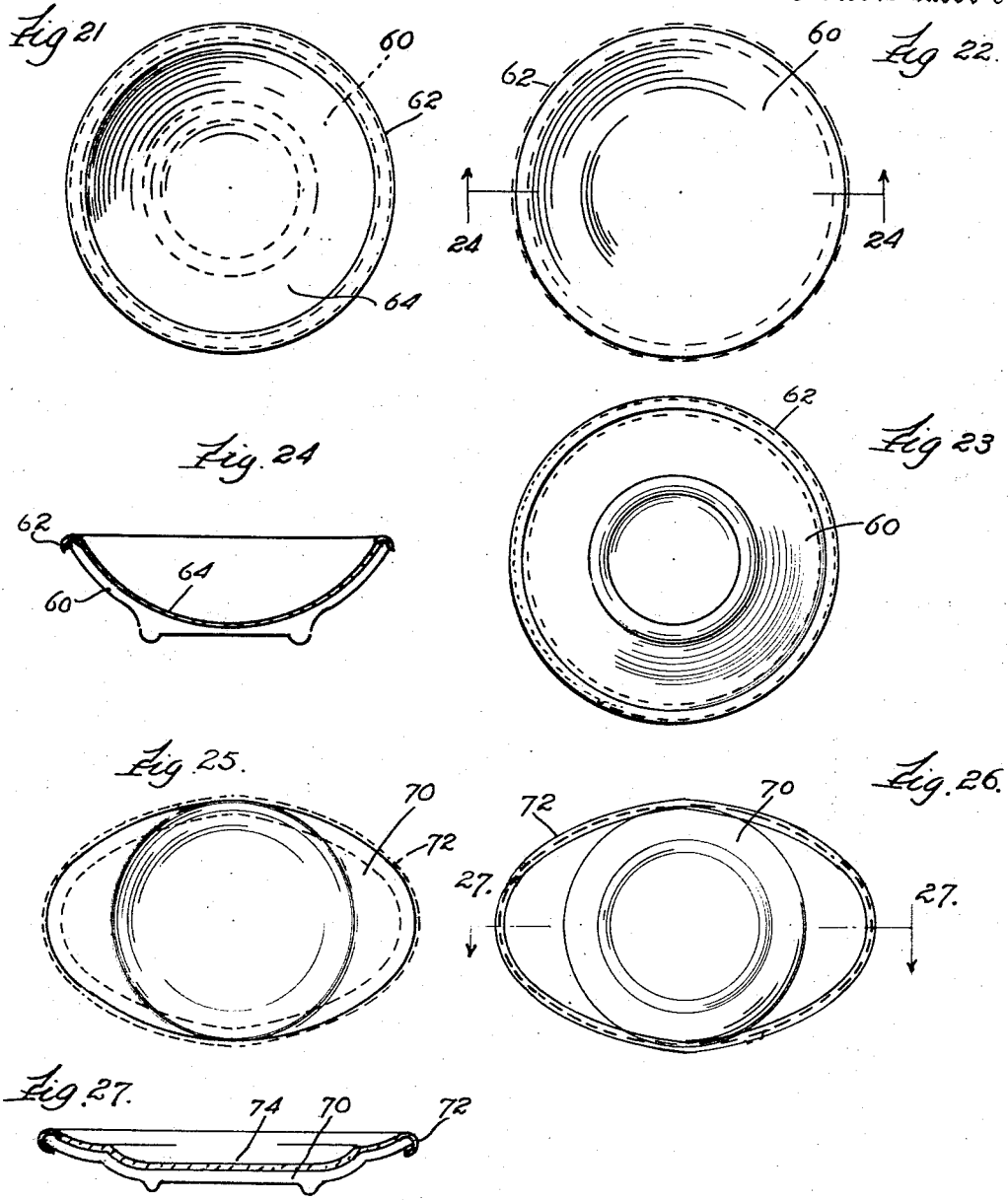
Inventor.
Paula Jackson.
by Robert H Wendt
Attorney.

United States Patent Office 3,352,449
Patented Nov. 14, 1967

3,352,449
SLIP COVERS FOR RECEPTACLES FOR FOOD
Paula Jackson, 4609 N. Dover St., Chicago, Ill. 60640
Filed July 26, 1965, Ser. No. 474,574
1 Claim. (Cl. 220—63)

ABSTRACT OF THE DISCLOSURE

The invention consists of slip covers for food receptacles, which conform to the top, and a second part conforming to the bottom, the slip cover being made of transparent, resilient, plastic adhering to the receptacle and exposing but protecting the decoration on the receptacle, the slip covers being adapted to be removed with the food and thrown away, thereby saving the user from the labor of washing dishes, the method of making the said slip covers being by stamping them with the same dies used for making the receptacles.

---

The present invention relates to slip covers for receptacles for food and is particularly concerned with removable and disposable plastic slip covers for dishes, cups, saucers, glasses, service plates, salad plates, soup bowls, sauce dishes, larger platters, oval vegetable dishes, including, in fact, all of the table dishes which appear on family tables.

One of the objects of the invention is the provision of slip covers for receptacles for food, which fits perfectly on the upper used surfaces of the receptacles in such manner that the slip covers are held in place, and being transparent the slip covers reveal the appearance of the receptacle which it covers, but it provides a smooth tough resilient transparent covering which can be manufactured so economically, that the slip covers may be discarded after use, thereby eliminating the labor of washing the dishes, which no one likes.

Another object is the provision of slip covers of the class described, which may be manufactured by using the same dies that are used in making the dishes on which they are used, thereby reducing the cost of such slip covers, so that they may be sold at prices within the range of a vast number of purchasers, and making the slip covers an item which is disposable after using the dishes, which may be kept in their original clean condition.

Another object of the invention is the provision of slip covers for dishes and the like, which fit so well that they engage directly the surface of the dishes, and removably adhere thereto by virtue of the air pressure or the suction which resists removal of the slip covers except by peeling them off from one edge, instead of lifting the entire slip cover off at right angles, thus insuring the coverage of the dishes while in use.

Another object is provision of lower slip covers for the bottom surfaces of certain dishes such as drinking glasses or cups, which may require cover below because of the nature of their use, and the provision of slip covers which, being transparent, reveal all the ornamental contours or decorative additions made on the original dishes, so that all the beauty of form or painting of the dishes are revealed through the slip covers which protect and preserve the dishes in their original form.

Some owners of dishes may prefer to apply slip covers at once after acquiring the dishes to protect the original form and surface, and thus the deposit of dust on the dishes may be avoided by discarding dirty slip covers and replacing them with new ones at minimum expense and saving the need for washing dishes, even to avoid dusty dishes.

Other objects and advantages of the invention will be apparent from the following description and the accompanying drawings, in which similar characters of reference indicate similar parts throughout the several views.

Figure 13:
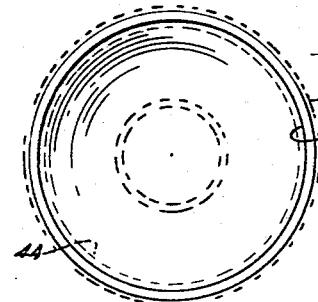
Figure 17:
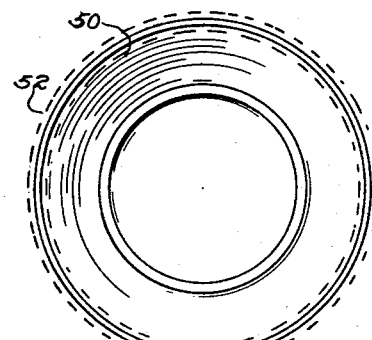
Figure 14:
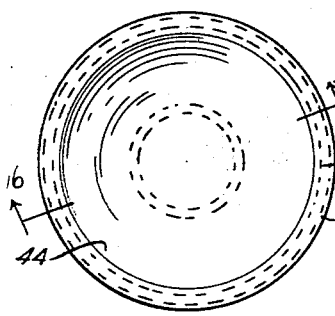
Figure 18:
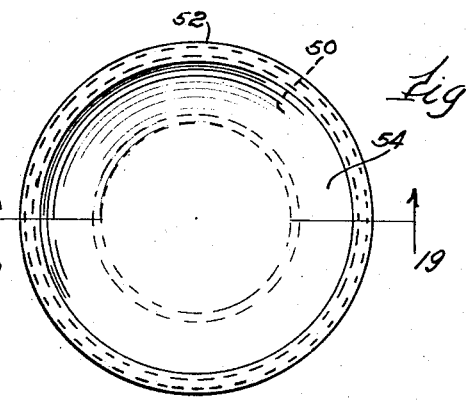
Figure 15:
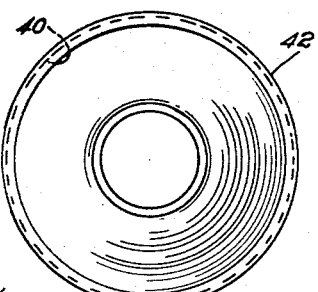
Figure 19:
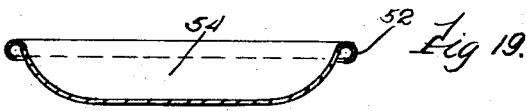
Figure 16:
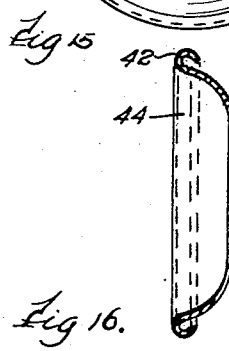
Figure 20:
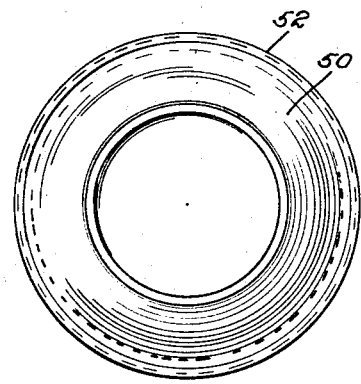

Referring to the three sheets of drawings accompanying the specification:

FIG. 1 is a top plan view of a service dish with the slip cover applied to the dish;
FIG. 2 is a bottom plan view of FIG. 1;
FIG. 3 is a top plan view of the slip cover alone;
FIG. 4 is a section on the plane of the line 4—4, looking in the direction of the arrows;
FIG. 5 is a rear elevational view of a cup with a slip cover applied thereto;
FIG. 6 is a top plan view of FIG. 5;
FIG. 7 is a bottom plan view of the slip cover of FIG. 5;
FIG. 8 is a sectional view taken on the plane of the line 8—8 of FIG. 5, looking in the direction of the arrows;
FIG. 9 is a side elevational view of a drinking glass, encased in a slip cover;
FIG. 10 is top plan view of FIG. 9;
FIG. 11 is a bottom plan view of FIG. 9;
FIG. 12, is a sectional view taken on the plane of the line 12—12, looking in the direction of the arrows;
FIG. 13 is a top plan view of a sauce dish with the slip cover shown in dotted lines;
FIG. 14 is a bottom plan view of FIG. 13;
FIG. 15 is a bottom plan view of the slip cover of FIG. 13;
FIG. 16 is a sectional view taken on the plane of the line 16—16 of FIG. 14, looking in the direction of the arrows;
FIG. 17 is a bottom plan view of a salad dish with slip cover dotted;
FIG. 18 is a top plan view of FIG. 17;
FIG. 19 is a sectional view of the slip cover on the plane of the line 19—19, of FIG. 18, looking in the direction of the arrows;
FIG. 20 is a bottom plan view of the salad dish of FIG. 18, with the slip cover applied;
FIG. 21 is a top plan view of a vegetable dish with the slip cover;
FIG. 22 is a top plan view of FIG. 21, with slip cover;
FIG. 23 is a bottom plan view of the dish of FIG. 21, with slip cover;
FIG. 24 is a sectional view of FIG. 22, taken on the plane of the line 24—24, looking in the direction of the arrows;
FIG. 25 is a top plan view of an oval platter with slip cover in dotted lines;
FIG. 26 is a bottom plan view of FIG. 25;
FIG. 27 is a sectional view of FIG. 26 taken on the plane of the line 27—27, looking in the direction of the arrows.

Referring to FIG. 1, this is a top plan of a service dish 10 provided with a slip cover 12, comprising a very thin, transparent plastic member, which is tough, yet resilient and adapted to fit closely on the top of the service dish and conforming thereto, so that it resists removal all at right angles, due to suction or air pressure on it but permits ready removal by lifting an edge first and peeling off the slip cover.

The slip cover 12 reveals all the shape and decoration of the dish, and protects the dish against food or contamination by dust and is so economically made by the same molds, that it may be discarded, to save the necessity for washing the dish and thus saving the hands from detergents usually employed in washing dishes, which no one likes.

The bottom of the dish 10 is exposed in this case as the food does not touch it, but the edge of the dish is protected by the curled edge 14, which extends over the edge just enough to protect the dish, but does not interfere with the removal of the cover 12.

Referring to FIGS. 5 to 8, 22 indicates a drinking cup, which is provided with a slip cover 24 of the same transparent plastic, with the edge of the slip cover curling over the edge of the cup 22. In this case 28 indicates the inner plastic slip cover, but the cup has an outer slip cover 26, which has a slot 30 for the cup handle so that the outer slip cover 26 may pass the handle and extend up under the curled edge of the inner slip cover 24, as the cup needs a removable slip cover inside and outside.

Referring to FIGS. 9 to 12, this shows an outer slip cover 36 for a drinking glass 38 having an inner slip cover 34 which extends up the inside and over the top edge as in the case of the cup.

Referring to FIGS. 13 to 16, these show a sauce dish 40, provided with a slip cover 44, fitting the inside of the sauce dish and extending over the edge at 42 as described in the preceding figures.

Referring to FIGS. 17 to 20, these show a salad dish 50 having a slip cover 52, and inside of the slip cover, being indicated at 54, and the upper edge of the slip cover curling over the edge of the salad dish, as in the preceding assemblies.

Referring to FIGS. 21 to 24, these show one form of soup dish 60 which is wider and deeper than a service plate, and has a slip cover 64 on its inside with its edge 62, curling over the upper edge of the soup dish 60, as in the preceding cases.

Referring to FIGS. 25 to 27, these show an elongated and oval meat serving dish 70, for all, with an inner slip cover 74, curling over the outer edge as shown at 72, in the preceding cases.

It will thus be observed that I have invented a slip cover for all the usual dishes employed by a family on its table, which comprises, in each case, a thin, transparent, tough, flexible film of plastic, adapted to fit closely against the upper surface of a food dish, and cover the dish and its edge so that the dish and its edge may never be engaged by food, and the slip cover may be removed and thrown away.

The slip covering is tough enough to permit cutting food with a knife, and in the cases of cups and drinking glasses, the bottom may also have an outer slip covering While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States is;

A slip cover assembly for dishes, bowls, cups, drinking glasses, platters, or the like, comprising an assembly having an upper cover and a lower cover, the upper cover having a central food receiving cavity in its upper surface, the exterior of said upper cover conforming closely to the inside of a food receptacle, on which the upper cover is intended to be used, the upper cover extending over the peripheral edge of said receptacle, and inward under said peripheral edge, whereby the said upper cover is removably retained on the receptacle, and the said lower cover having an upper cavity, closely conforming to the outside of said receptacle, and extending upward about the peripheral edge of said upper cover and said receptacle, to be removably retained on said receptacle and said upper cover, both of said covers being constructed of thin, transparent, tough, flexible film of resilient plastic, both covers being imperforate fitting closely against the edge and outer surfaces of said receptacle, and adhering thereto by virtue of the air pressure or the suction which tends to prevent the removal of the slip coverings, at right angles to the surface of the receptacle, the said slip covers revealing all the shape and decoration of the receptacle, through the transparent covering and protecting the receptacles, against contamination by food or dust, and being removable from the receptacle to be discarded, and to save the necessity of washing the receptacle.

References Cited
UNITED STATES PATENTS 2,083,741   6/1937   Pearson   220—63
2,709,904   6/1955   Boughton   220—63

DONALD F. NORTON, *Primary Examiner.*

THERON E. CONDON, *Examiner.*

G. T. HALL, *Assistant Examiner.*